United States Patent
Oswald (10) Patent No.: US 9,653,919 B2
(45) Date of Patent: May 16, 2017

(54) METHOD FOR REDUCING COMMON MODE CURRENT CIRCULATING BETWEEN THE INTERNAL GROUND OF AN ELECTRICAL CIRCUIT AND THE EARTH

(71) Applicant: Valeo Systemes de Controle Moteur, Cergy Pontoise (FR)

(72) Inventor: Dominique Oswald, Houilles (FR)

(73) Assignee: VALEO SYSTEMES DE CONTROLE MOTEUR, Cergy Pontoise (FR)

( * ) Notice: Subject to any disclaimer, the term of this patent is extended or adjusted under 35 U.S.C. 154(b) by 152 days.

(21) Appl. No.: 14/180,072

(22) Filed: Feb. 13, 2014

(65) Prior Publication Data

US 2014/0225440 A1    Aug. 14, 2014

(30) Foreign Application Priority Data

Feb. 13, 2013 (FR) ..................... 13 51201

(51) Int. Cl.
*H02J 3/00* (2006.01)
*H02M 1/12* (2006.01)
*H02M 1/44* (2007.01)

(52) U.S. Cl.
CPC ............ *H02J 3/00* (2013.01); *H02M 1/12* (2013.01); *H02M 1/44* (2013.01); *H02M 2001/123* (2013.01); *Y10T 307/549* (2015.04)

(58) Field of Classification Search
CPC ..... H02M 1/12; H02M 2001/123; H02M 1/44
See application file for complete search history.

(56) References Cited

U.S. PATENT DOCUMENTS

| 5,831,842 | A  | * | 11/1998 | Ogasawara | H02M 1/12 363/34 |
| 6,208,098 | B1 | * | 3/2001 | Kume | H02M 1/126 318/400.25 |
| 8,058,931 | B1 | * | 11/2011 | Zhou | H03F 1/14 330/292 |
| 2004/0004514 | A1 | | 1/2004 | Pelly | |
| 2009/0121805 | A1 | * | 5/2009 | Tucker | H02M 1/12 333/167 |
| 2010/0295508 | A1 | | 11/2010 | Mueller et al. | |

FOREIGN PATENT DOCUMENTS

WO    2010/057892 A1    5/2010

* cited by examiner

*Primary Examiner* — Jue Zhang
*Assistant Examiner* — Lakaisha Jackson
(74) *Attorney, Agent, or Firm* — Osha Liang LLP (57) ABSTRACT

A method for reducing the common mode current (i) circulating between the internal ground (13) of an electrical circuit (4) and the earth when electrical energy is exchanged between an electrical energy storage unit of the electrical circuit (4) and an electrical energy source external to said circuit (4),
in which method an electronic component (21) is used to apply an electrical quantity (Vs, Is) at
a point (26) connected via at least one impedance (28) to an electrical line (5) of said circuit (4) via which electrical energy is exchanged,
said electrical quantity (Vs, Is) applied making it possible to reduce the common mode current (i).

18 Claims, 8 Drawing Sheets

METHOD FOR REDUCING COMMON MODE CURRENT CIRCULATING BETWEEN THE INTERNAL GROUND OF AN ELECTRICAL CIRCUIT AND THE EARTH

FIELD OF THE INVENTION

The object of the present invention is to reduce the common mode current circulating between the internal ground of an electrical circuit and the earth, when electrical energy is exchanged between an electrical energy source external to said circuit and an electrical energy storage unit of said circuit. The electrical energy source belongs, for example, to an electricity network which is notably, but not exclusively, an electricity network in which the neutral is directly connected to the earth.

The electricity network can be an AC voltage network, polyphase or not, and this voltage is then rectified to supply the electrical energy storage unit of the electrical circuit, for example a battery.

BACKGROUND OF THE INVENTION

The problem that the invention aims to resolve will be explained with reference to the following nonlimiting example. The electrical circuit is, for example, installed in a vehicle and can comprise an electric motor for the electrical propulsion of the vehicle. The vehicle also comprises a chassis.

When the electrical energy storage unit is recharged by the electricity network, the chassis is connected to the earth. Because of the presence of components, spurious or not, between the electrical circuit and the chassis, a common mode current can circulate from the circuit to the chassis and loop back via the earth into the electricity network.

Such a common mode current is hazardous for a user standing on the earth and leaning on the chassis of the vehicle.

Also, standards exist for limiting the value of the common mode current that is acceptable between the part of the electrical circuit downstream of a rectifier and the chassis. The European standards thus limit the maximum value of the common mode current to 3.5 mA at a frequency of 50 Hz.

To observe these standards, it is known practice to provide an isolating transformer between the part of the circuit downstream of the reactifier and the chassis. Such a transformer can be costly and its integration in a space that is already limited such as a vehicle can be difficult.

It is also known practice to use, to rectify the current, a component with controllable switches, such as a so-called PFC (Power Factor Corrector) component, and to implement particular strategies for the control of the switches. Such strategies can lead to an overheating of the switches and be very complex.

In the high frequency domain, the publication "A simplified active input EMI filter of common-mode voltage cancellation for induction motor drive" discloses an active filter making it possible to reduce the common mode current at high frequencies by injecting a voltage in series into the electricity network.

Also known from the application US 2004/0004514 is an active filter seeking to reduce the common mode current at high frequencies in the field of electromagnetic compatibility (EMC).

SUMMARY OF THE INVENTION

The invention aims to remedy the drawbacks of the above solutions to reduce the common mode current between the electrical circuit and the earth.

The invention achieves this, according to one of its aspects, using a method for reducing the common mode current circulating between the internal ground of an electrical circuit and the earth when electrical energy is exchanged between an electrical energy source external to said circuit and an electrical energy storage unit of said circuit, in which method an electronic component is used to apply an electrical quantity at an injection point connected via at least one impedance, notably a capacitor, to an electrical line of the circuit via which the exchange of electrical energy takes place, said electrical quantity applied making it possible to reduce the common mode current, notably that circulating between the internal ground of the circuit and the earth.

The electrical energy source can form part of an electricity network and the electrical quantity applied can make it possible to reduce the common mode current at the frequency of the electricity network. The electrical quantity applied can also make it possible to reduce the common mode current at the first ten harmonics of this frequency of the electricity network.

The point connected via at least one impedance to the electrical line will hereinafter be called "injection point". Subsequently:
  "upstream of the injection point" will be used to designate the part of the electrical line arranged between the electricity network and the impedance or impedances connected to the injection point, that is to say upstream of said impedances, and
  "downstream of the injection point" will be used to mean the part of the electrical line arranged between the impedance or impedances connected to the injection point and the electrical energy storage unit, that is to say downstream of said impedances.

The injection point can be connected to the electrical line via at least one capacitor. The capacitance of each capacitor can be of the order of one μF.

As a variant, the injection point can be connected to the electrical line via at least one coil, or via at least one resistor or via one transformer or via an association of the components which have just been cited.

The electrical quantity applied to the injection point by the electronic component can be:
  an electrical potential, in which case a voltage is applied by the electronic component between said injection point and the earth, or
  an electrical current, in which case this current circulates between said injection point and the earth.

The electrical quantity applied by the electronic component when the above method corresponds to a charging of the electrical energy storage unit of the circuit from the electrical energy source of the network can provoke the generation of a current opposing the common mode current circulating in the electrical line downstream of the injection point.

When the electronic component applies an electrical current at the injection point, it is this current which is the abovementioned generated current.

When the electronic component applies an electrical potential to the injection point, the application of this potential provokes the generation of the abovementioned electrical current.

The current thus generated because of the application of said electrical quantity by the electronic component can have a value less than or equal to the value of the common mode current circulating in the electrical line downstream of the injection point. This current generated has a value, for example, as an absolute value of at least 50%, better 60%, better 70%, better 80%, better 90%, better 95%, of the common mode current circulating in the electrical line downstream of the injection point.

The closer the value of the current thus generated is to the value of the common mode current in the electrical line downstream of the injection point, the more the value of the common mode current circulating in the electrical line upstream of the injection point, that is to say, among other things, in the electricity network, can be reduced, by the application of the nodes law. The current generated by the application by the electronic component of said electrical quantity can thus be an image as close as possible to the common mode current circulating in the electrical line downstream of the injection point.

The electrical line can be single-phase, in which case said injection point can be connected:
  to the phase of the electrical line via at least one impedance inserted between said point and said phase, and
  to the neutral of the electrical line via at least one impedance inserted between said injection point and said neutral.

In a variant of the case of a single-phase electrical line, the injection point can be connected only to the phase, respectively to the neutral, of the electrical line via an impedance without being connected to the neutral, respectively to the phase, of said electrical line.

As a variant, the electrical line can be three-phase, in which case the injection point can be connected to each phase of the electrical line via at least one respective impedance.

In a variant of the case of a three-phase electrical line, the injection point is not connected to certain phases of the line.

More generally, the electrical line can be polyphase, the number of phases being able to be other than three.

Said quantity can be applied by the electronic component at least as a function of a signal representative of the common mode current, notably measured upstream of the injection point. In other words, the electronic component can generate said quantity at least as a function of a signal representative of the common mode current, the latter being measured at one or more points of the electrical line.

According to a first exemplary implementation of the invention, said quantity is applied by the electronic component as a function only of a signal representative of the common mode current, notably as a function only of a signal representative of the common mode current measured upstream of the injection point. In other words, the electronic component generates said quantity only as a function of this signal representative of the common mode current, the latter being measured at just one or several points of the line, notably at a single point upstream of the injection point.

The electronic component can, when said quantity is generated only as a function of the signal representative of the common mode current measured at a single point of the electrical line, be likened to a loop with a single gain.

According to a second exemplary implementation of the invention, notably when said electrical quantity is an electrical potential, said quantity is applied by the electronic component as a function:
  of a signal representative of the common mode current, notably measured upstream of the injection point, and
  of a signal representative of the current circulating between said injection point and the earth.

In other words, the electronic component can generate said quantity as a function of a signal representative of the common mode current measured at just one or several points of the line, notably only upstream of the injection point, and of a signal representative of the current circulating between said injection point and the earth.

When the signal representative of the common mode current is measured at just one point according to this second exemplary implementation of the invention, the electronic component can be likened to a loop with two gains.

The electronic component can then comprise:
  a first sub-component receiving as input the signal representative of the common mode current, notably measured upstream of the injection point, and
  a second sub-component receiving as input the signal representative of the current circulating between said injection point and the earth,
the outputs of each sub-component being added together to generate said quantity applied by the electronic component.

The first sub-component can be identical to the electronic component according to the first embodiment. As a variant, the first sub-component can provide a gain of a value greater than that of the gain provided by the electronic component according to the first embodiment.

The second sub-component can provide a second gain making it possible to improve the stability at high and low frequencies by eliminating the oscillations induced by the first sub-component for these high and low frequencies. This second sub-component can thus lock the current generated by the application of said electrical quantity to a value equal to the product of the gain provided by the first sub-component and of the measured common mode current.

According to a variant of this second exemplary implementation of the invention, the common mode current can be measured at two different points of the electrical line, and the quantity applied by the electronic component can be determined as a function:
  of a signal representative of the common mode current measured on the electrical line between the electrical energy source of the network and the impedance or impedances connecting the electrical line to said injection point, that is to say upstream of the injection point,
  of a signal representative of the common mode current measured on the electrical line between the impedance or impedances connected to the injection point and the electrical circuit, that is to say downstream of the injection point, and
  of a signal representative of the current circulating between said injection point and the earth, that is to say of the current generated by the application of said electrical quantity by the electronic component.

In other words, two distinct measurements representing the common mode current can be used for the generation of said electrical quantity.

The measurement of the common mode current downstream of the injection point can make it possible to produce a feed-forward.

According to this variant, the electronic component can, to produce this loop with two gains with feed-forward, have:
  a first sub-component receiving as input the signal representative of the common mode current measured upstream of the impedance or impedances connected to said injection point,
  a second sub-component receiving as input: both the signal representative of the current circulating between said injection point and the earth, and the output of a third sub-component, these two signals being notably compared to one another, i.e. subtracted from one another, before processing by the second sub-component, a third sub-component receiving as input the signal representative of the common mode current measured downstream of the impedance or impedances connected to the injection point, and whose output is one of the inputs of the second sub-component. The third sub-component can behave like a gain, notably a unitary gain.

According to a variant of the second exemplary implementation of the invention, notably when said electrical quantity is an electrical current, said quantity is applied by the electronic component as a function:
- of a signal representative of the common mode current upstream of the injection point, and
- of a signal representative of the common mode current downstream of the injection point.

The electronic component can be likened to a loop with two gains.

The electronic component can then comprise:
- a first sub-component receiving as input the signal representative of the common mode current upstream of the injection point, and
- a second sub-component receiving as input the output of a third sub-component whose input is a signal representative of the common mode current downstream of the injection point, the outputs of the first and of the second sub-components being added together to generate said quantity applied by the electronic component.

The first sub-component can be identical to the electronic component according to the first embodiment. As a variant, the first sub-component can provide a gain of a value greater than that of the gain provided by the electronic component according to the first embodiment.

The second sub-component can provide a second gain making it possible to improve the stability at high and low frequencies by eliminating the oscillations induced by the first sub-component for these high and low frequencies. This second sub-component can thus lock the current applied to the injection point to a value equal to the product of the gain provided by the first sub-component and of the measured common mode current.

According to a third exemplary implementation of the invention, notably when said electrical quantity is an electrical potential, said electrical quantity is applied by the electronic component as a function:
- of a signal representative of the common mode current, notably measured upstream of the injection point,
- of a signal representative of the current circulating between said injection point and the earth, and
- of a signal representative of the current circulating in a capacitor of an electromagnetic interference filter, the electromagnetic interference filter being arranged between the impedance or impedances connecting the electrical line to the injection point, and the electrical energy storage unit, i.e. downstream of the injection point.

In other words, the electronic component can generate said electrical quantity as a function:
- of the common mode current for which a representative signal is measured at just one or several points of the electrical line, notably only upstream of the injection point,
- of a signal representative of the current circulating between the injection point and the earth, and
- of a signal representative of the current circulating in the electromagnetic interference filter.

The electromagnetic filter, also called EMI filter, or EMC filter, generally comprises capacitors called "Y capacitor". A number of Y capacitors can connect to the earth a point also connected to each conductor of the electrical line by other capacitors, and said current in the electromagnetic interference filter for which a measurement is used as input for the electronic component according to this third exemplary implementation of the invention is, for example, that circulating in one of these Y capacitors.

When the signal representative of the common mode current is measured at just one point of the electrical line, notably upstream of the injection point, according to this third exemplary implementation of the invention, the electronic component can be likened to a loop with two gains with the addition of a feed-forward.

In a manner similar to the second exemplary implementation of the invention, the electronic component can, to produce this loop with two gains with feed-forward, have:
- a first sub-component receiving as input the signal representative of the common mode current measured upstream of the impedance or impedances connected to the injection point,
- a second sub-component receiving as input: both the signal representative of the current circulating between the injection point and the earth, and the output of a third sub-component, a subtraction operation between these two signals being notably performed before the processing of the signal resulting therefrom by the second sub-component, and
- a third sub-component receiving as input the signal representative of said current in the electromagnetic interference filter, and whose output is one of the inputs of the second sub-component.

The third sub-component can be dedicated to the feed-forward and make it possible, with the second sub-component, to check the common mode current in open loop mode. The first sub-component can then make it possible to eliminate the residual errors after processing by the second and third sub-components. These residual errors are, for example, linked to the imprecise knowledge:
- of the value of the impedance that exists, because of the presence of the electromagnetic interference filter, between the electrical line and the earth,
- of the value of the stray capacitor impedance that exists between the ground of the electrical circuit and the earth, and
- of the value of the impedance of the earth.

According to a variant of the third exemplary implementation of the invention, notably when said electrical quantity is an electrical current, said electrical quantity is applied by the electronic component as a function:
- of a signal representative of the common mode current upstream of the injection point, and
- of a signal representative of the current circulating in a capacitor of an electromagnetic interference filter, the electromagnetic interference filter being arranged between the impedance or impedances connecting the electrical line to the injection point, and the electrical energy storage unit, i.e. downstream of the injection point.

In other words, the electronic component can generate said electrical quantity as a function:

of the common mode current for which a representative signal is measured upstream of the injection point, and
of a signal representative of the current circulating in the electromagnetic interference filter.

The electronic component can be likened to a loop with two gains.

In a manner similar to the second exemplary implementation of the invention, the electronic component can, to produce this loop with two gains, have:
- a first sub-component receiving as input the signal representative of the common mode current measured upstream of the impedance or impedances connected to the injection point,
- a second sub-component receiving as input the output of a third sub-component whose input is a signal representative of said current in the electromagnetic interference filter.

In all of the above, the common mode current can be measured on the electrical line using a magnetic core around which are wound:
each conductor of the electrical line, and
a measurement conductor.

The magnetic core is, for example, a nanocrystalline or ferrite magnetic core. The signal representative of the common mode current can then be a voltage, but any other representative signal is possible, including the measurement of the common mode current itself.

When the electrical energy is exchanged between the electrical energy source and the electrical circuit in the form of a three-phase signal, the signal representative of the current circulating in each phase can be measured and each of these signals can be added together vectorially to obtain the signal representative of the common mode current.

The invention can thus make it possible to determine dynamically the value of the electrical quantity to be applied to reduce the common mode current.

The electronic component can be configured in such a way as to lock the value of the common mode current upstream of the injection point, for which it receives a representative signal as input, to a predefined setpoint value, notably zero or any value less than the maximum value accepted by the standards.

The method according to the invention then proposes using an active filter to lock the value of the common mode current upstream of the injection point preferably to zero, unlike the solutions as disclosed by the application US 2010/0295508, which teaches injecting a current identical to the common mode current downstream of the injection point, so that, by a nodes law, the common mode current circulating upstream of the injection point, and therefore notably in the electrical energy source of the electricity network, is zero. The solution disclosed by the application US 2010/0295508 does not thus consist in directly locking the common mode current upstream of the injection point to zero but in acting indirectly thereon by working on the common mode current downstream of the injection point.

The component can form an active filter of the common mode current only at the frequency of the network, the latter generally being 50 Hz or 60 Hz.

As a variant, the electronic component can be configured to filter:
only the common mode current at the frequency of the network, and
only the first ten harmonics of the frequency of the network, of this common mode current.

In the case where the electricity network supplies a voltage at 50 Hz, the electronic component can thus filter the common mode current for frequencies between 50 Hz and 500 Hz.

The electronic component can exhibit a gain in dB that is positive for frequencies between 5 Hz and 1.1 kHz. The electronic component can have no field effect transistor. The electronic component comprises, for example, bipolar transistors, notably dimensioned to withstand a voltage Vice of the order of 450 V.

The electronic component can behave as a gyrator.

In all the above examples, the component can apply a single voltage between the injection point and the earth.

As a variant, in all the above examples, said voltage can be applied between the injection point and the earth, by applying:
a first voltage between the injection point and the internal ground of the electronic component, and
a second voltage, with a sign opposite to that of the first voltage, between the earth and the internal ground of the electronic component,
in such a way that the difference between the first and the second voltages is equal to said applied voltage.

It is thus possible to use two amplifiers to produce said applied voltage. In this way, each amplifier can be produced using components that are less costly than the components needed to produce an amplifier that on its own ensures the generation of said applied voltage.

The internal ground of the circuit and the internal ground of the electronic component cannot be connected to one another. They are notably not at the same potential.

The electrical circuit can comprise a rectifying stage for rectifying the AC voltage supplied during the charging of the electrical energy storage unit by the electrical energy source, this stage having a positive output terminal and a negative output terminal, and the internal ground of the circuit can be formed by the negative or positive output terminal of said stage.

The rectifying stage may or may not be configured to adapt the value of the rectified voltage to the components downstream of this stage. The rectifying stage is, for example, a PFC component, notably a bridgeless PFC component.

According to an exemplary implementation of the invention, the electrical energy storage unit is connected between the positive and negative output terminals of the rectifying stage. As already mentioned, the above method is notably implemented when this energy storage unit is recharged by the electrical energy source.

The electrical energy storage unit is, for example, formed by one or more batteries. In the latter case, the batteries can be installed and series and/or in parallel.

The voltage at the terminals of the energy storage unit, when it is charged, can be between 150 V and 450 V. The electrical power absorbed by the energy storage unit can be greater than or equal to 100 W, for example of the order of a few kW when the electricity network is single-phase, even 20 kW or more with a three-phase network.

The electrical energy storage unit can be installed on a vehicle with electrical or hybrid propulsion and said unit can be intended to power an electrical propulsion motor of the vehicle. More generally, the electrical circuit can be installed on this vehicle.

The electrical circuit can comprise inductors formed by the windings of the stator of the electric motor.

The electronic component can be installed on the vehicle or be arranged outside the latter, being, for example, incorporated in a recharging terminal of the electricity network to which a connector of the electrical circuit is connected in order to transfer electrical energy between the electrical energy source, via the terminal, and the electrical circuit.

Advantageously, it is not necessary to provide galvanic insulation between the internal ground of the electrical circuit and the electricity network to which the circuit is connected to exchange electrical energy therewith.

By virtue of the electronic component, the circuit need not have any galvanic insulation with the earth, although there is a stray capacitance between 0 and 350 nF, notably between 70 nF and 350 nF, between said circuit and the earth.

Another subject of the invention, according to another of its aspects, is an electronic component for implementing the method defined above.

Yet another subject of the invention, according to another of its aspects, is an electrical circuit, comprising:

a rectifying stage for rectifying an AC input voltage, said stage having a positive output terminal and a negative output terminal, and the circuit having an internal ground formed by one of said output terminals, an electrical line suitable for connection to an electrical energy source so as to allow for an exchange of electrical energy between said source and said circuit, the line being connected to said rectifying stage, directly or not, an electronic component connected on the one hand to the electrical line and suitable for connection on the other hand to the earth, the component being configured to apply, at an injection point connected via at least one impedance, notably a capacitor, an electrical quantity to the electrical line making it possible, when the electrical energy is exchanged between said electrical energy source and said circuit, to reduce the common mode current circulating between the internal ground of the circuit and the earth.

The electrical circuit can be installed on a vehicle with hybrid or electrical propulsion. As a variant, the circuit can belong to any other electrical appliance, for example to a power supply system of an electric motor, synchronous or asynchronous.

The assembly can be incorporated in any system for which galvanic insulation is costly, for example to battery chargers absorbing an electrical power greater than or equal to 100 W.

The features presented above in relation to the method can also be combined, individually or not, with the above circuit.

In all of the above, when a signal representative of the common mode current is measured at only a single point, this point can be located on the electrical line upstream of the injection point. The common mode current upstream of the injection point can then be locked by the electronic component to a predefined value, for example zero.

BRIEF DESCRIPTION OF THE DRAWINGS

The invention will be able to be better understood on reading the following of a nonlimiting exemplary implementation thereof and on studying the appended drawing in which.

DETAILED DESCRIPTION

Figure 1:
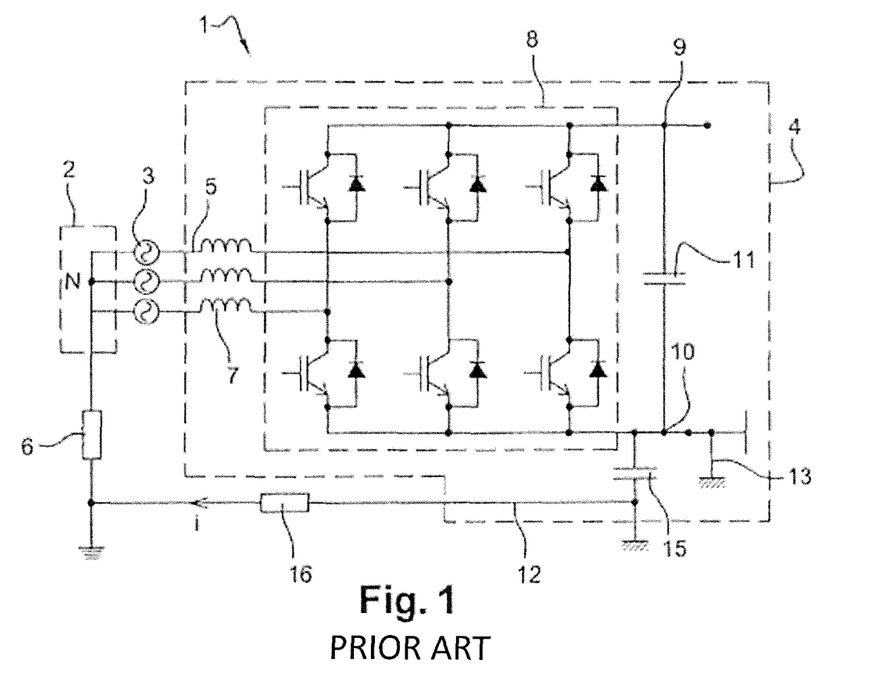
FIG. 1 schematically represents an assembly in which the invention can be implemented, FIG. 2 schematically represents a common mode model, equivalent to the assembly of FIG. 1.

FIG. 1 shows an assembly 1 in which the invention can be implemented.

This assembly 1 comprises an electrical energy source 2 of an electricity network suitable for connection via a connector 3 to an electrical circuit 4. The electrical circuit 4 is, in the example considered, installed on a vehicle with hybrid or electrical propulsion, then forming part of the electrical propulsion circuit of this vehicle.

When an electrical energy storage unit (not represented) of the electrical circuit 4 is to be charged, the electrical energy source 2 supplies, for example, an AC voltage to the electrical circuit 4. In the example considered, the network is three-phase and the voltage at the terminals of the electrical energy source 2 has a root mean square value equal to 230 V. The frequency of the voltage is 50 Hz in the example considered. The neutral N of the electricity network is connected to the earth, and a spurious impedance 6 is inserted between the neutral N and the earth.

The electrical circuit 4 comprises:
an electrical line 5 connecting the connector 3 to the rest of the electrical circuit 4,
inductors 7, and
a rectifying stage 8 for rectifying the AC voltage supplied by the electrical energy source 2 and whose output terminals 9 and 10 are passed through by a DC current.

The rectifying stage 8 comprises, for example, controllable switches such as transistors. The stage 8 is, for example, a PFC component, known to a person skilled in the art for rectifying an AC voltage, matching the value of the rectified voltage to the load of the circuit 4, and observing the current standards regarding the value of the power factor and the emission of harmonic currents.

Between the output terminals 9 and 10 of the stage 8, a capacitor 11 is installed. The electrical energy storage unit, which is, for example, a battery, can be connected in parallel with this capacitor 11. This battery absorbs an electrical power that is, for example, greater than 100 W, for example of the order of 3 kW when the electricity network is single-phase, for example a power of the order of 20 kW when the electricity network is three-phase.

The assembly 1 also comprises a metal chassis 12. In the event of a chassis earthing fault, said chassis is potentially connected to the earth via an impedance 16. This impedance 16 corresponds, in the case where the chassis forms part of a vehicle, to the bodily resistance of the user of the vehicle when the latter touches, on the one hand, the bodywork and, on the other hand, the ground.

In the application where the assembly 1 is installed on a vehicle with electrical or hybrid propulsion, the inductors 7 then correspond, for example, to the windings of the phases of the stator of an electric motor for the propulsion of an electric motor. The windings 7 can then be connected to the electricity network according to the teaching of application WO 2010/057892.

Figure 3:
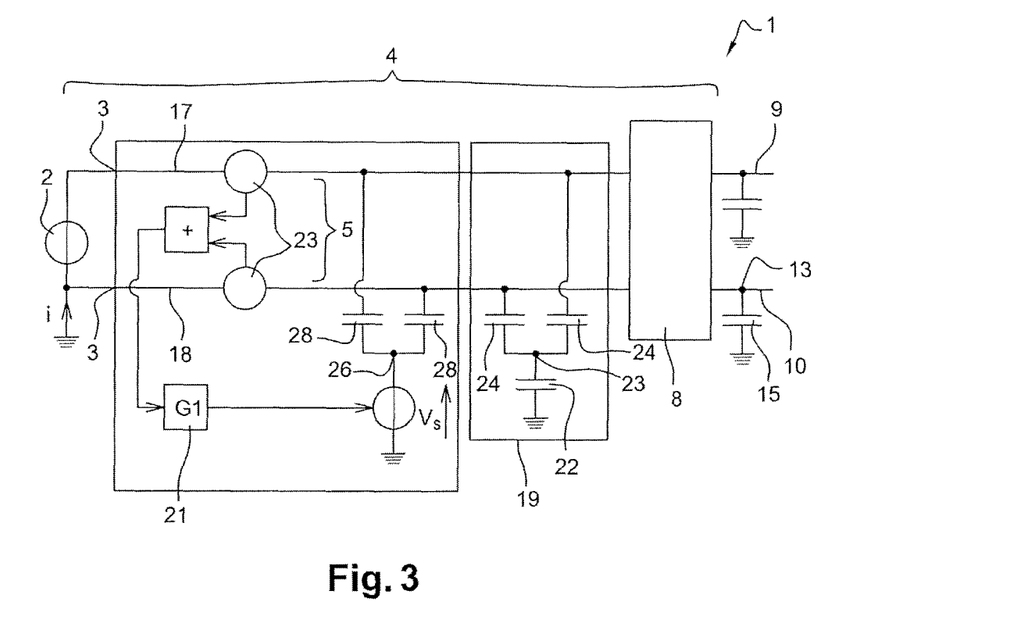
FIG. 3 is a representation similar to that of FIG. 1 in which an electronic component according to a first exemplary implementation of the invention is introduced.

A capacitance 15 models the stray impedances and/or the real impedances added for technical reasons, in the form of electronic components of capacitor type, notably between the terminal 10 of the circuit 4 and the chassis 12. Another capacitance can exist between the terminal 9 of the circuit 4 and the chassis 12, as can be seen in FIG. 3.

The terminal 10 of the circuit 4 is, here, the negative output terminal of the rectifier stage 8 and the electrical circuit 4 has an internal ground 13 which, here, is formed by the terminal 10. Because of the existence of this capacitor 15, common mode current i can circulate from the circuit 4 to the chassis 12 and, by circulating into the earth, loop back into the electricity network.

In the case where the electrical energy source 2 of the electricity network supplies a polyphase AC voltage, and during an operating sequence of the switches of the rectifier stage 8, the terminal 10 is alternately connected to the neutral of the electricity network and to one of the phases of this electricity network. In the case of a single-phase electricity network, the terminal 10 is selectively connected to the neutral or to the phase of the electricity network.

A voltage E is thus applied between the terminal 10 and the chassis 12 connected to the earth and, because of this voltage and of the capacitor 15, current circulates from the terminal 10 to the earth.

The part of the circuit 4 upstream of the terminal 10, and the electricity network, can thus be likened to a virtual voltage source 20 applying, alternately, between the terminal 10 and the chassis 12:

a zero voltage E, and a voltage E that is the image of that delivered by the network to the circuit 4.

Figure 2:
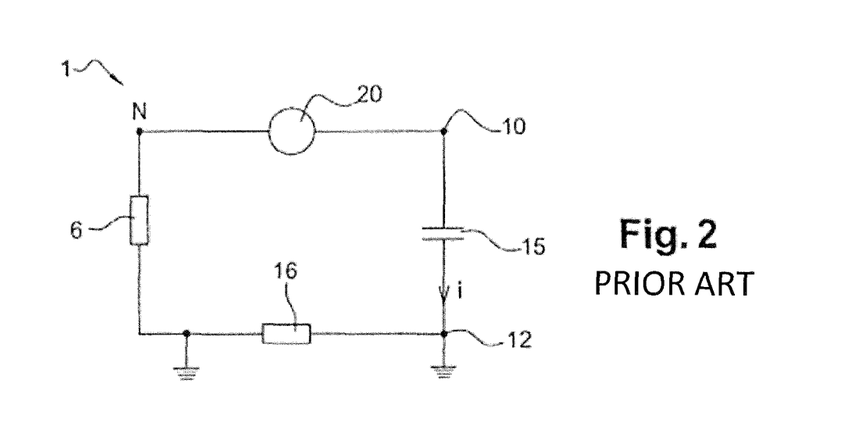

Consequently, common mode current i circulates through the capacitor 15 and the impedances 16 and 6 before looping back into the network. The equivalent common mode model according to FIG. 2 is thus obtained.

An exemplary implementation of the invention will be described with reference to FIG. 3. In this figure, the electrical line 5 is single-phase, comprising a conductor 17 forming the phase and another conductor 18 forming the neutral N, but the invention is not limited to a single-phase line.

Compared to the assembly represented in FIG. 1, the assembly 1 of FIG. 3 comprises an electromagnetic interference filter 19 incorporated in the circuit 4 and comprising a capacitor 22, here being a Y capacitor, installed between the earth and a point 23 connected to each conductor 17 or 18 of the electrical line 5 via a capacitor 24, here being an X capacitor.

As can be seen in FIG. 3, an electronic component 21 is incorporated in the circuit 4. This electronic component 21 is here configured to apply an electrical potential at a point 26, such that a voltage Vs is applied between this point 26 and the earth. The invention is not however limited to an electronic component applying an electrical potential, as will be seen hereinbelow.

This component 21 is an active filter configured to apply, at a frequency equal to that of the voltage supplied by the electricity network, an electrical potential from which the voltage Vs derives, this voltage Vs being applied between the point 26 and the earth and opposing the voltage applied by the virtual voltage source 20. The resultant voltage applied to the impedances 6 and 16 is thus reduced, notably canceled, such that the current passing through these impedances 6 and 16 is reduced, notably canceled.

The point 26 is connected to each conductor 17 or 18 of the electrical line 5 via a respective capacitor 28 in the example described. Each capacitor 28 notably has a capacitance of the order of one µF. The potential applied by the electronic component 21 and from which the voltage Vs results is, in the example considered, generated solely on the basis of a signal representative of the common mode current i measured on the electrical line 5 upstream of the point 26.

In the example considered, the component 21 is associated with a measurement system 23 for measuring the common mode current i passing along the electrical line 5. In the case of a single-phase electrical line 5, this measurement system 23 can measure a signal representative of the current in the conductor 17 forming the phase and a signal representative of the current in the conductor 18 forming the neutral, for example using a magnetic core, nanocrystalline or not. By calculation based on these signals representative of current, the value of a signal representative of the common mode current i can be determined. On the basis of this information, the electronic component 21 generates the potential from which the voltage Vs, which is applied between the point 26 and the earth, results.

As represented in FIG. 3, the electronic component 21 behaves overall like the gain G1 and, by using:

Zinj to designate the impedance existing between the point 26 and the earth by virtue of the presence of the voltage Vs, Zy to designate the impedance existing between each conductor 17, 18 and the earth by virtue of the presence of the capacitor 22 and of the stray capacitance or capacitances 15, Vac to designate the voltage at the terminals of the electrical energy source 2, the value of the common mode current i circulating in the electrical line 5 in the presence of the electronic component is given by the expression:

$$i = \frac{(Zinj + Zy) \cdot Vac/2}{Zy \cdot (Zinj + G_1)}$$

Figure 4:
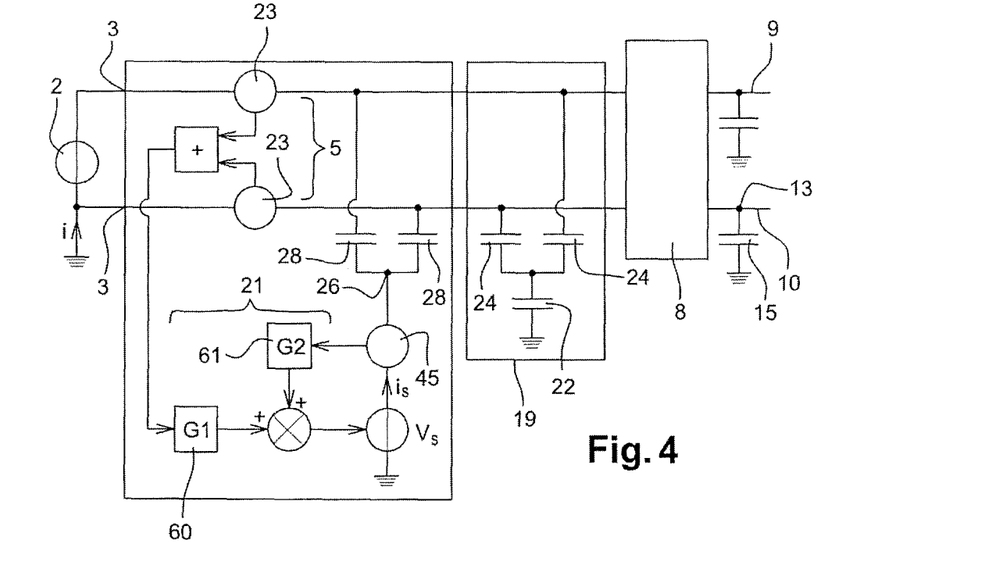
FIGS. 4 and 5 represent, in a manner similar to FIG. 3, two variants of an electronic component according to a second exemplary implementation of the invention.
Figure 5:
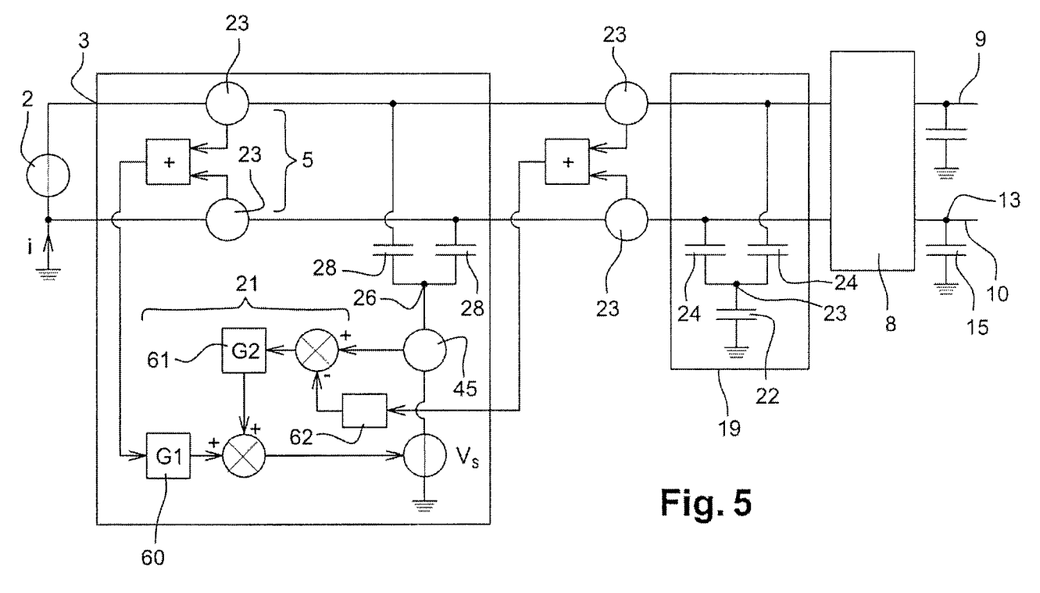

There now follows a description, with reference to FIGS. 4 and 5, of an electronic component 21 according to a second exemplary implementation of the invention.

Unlike the electronic component of FIG. 3, which can be likened to a loop with a single gain generating a potential from which the voltage Vs results on the basis only of the value of a signal representative of the common mode current i, the electronic component according to this second exemplary implementation of the invention generates the voltage Vs both on the basis of a signal representative of the common mode current i passing along the electrical line 5 and on the basis of a signal representative of the current Is circulating between the point 26 and the earth, this current Is being able to be called "output current of the electronic component 21". A second measurement system 45, arranged between the point 26 and the earth, can make it possible to obtain a signal representative of said output current.

Schematically the electronic component 21 can be considered here to form a loop with two gains:

a first sub-component 60 behaving like a gain G1 amplifying the signal representative of the common mode current i in the electrical line 5 measured by the system 23, and a second sub-component 61 behaving like a gain G2 amplifying the signal representative of the output current Is circulating between the point 26 and the earth.

With the same notations as previously, the equation giving the value of the common mode current i when the electronic component 21 according to FIG. 4 is used is:

$$i = \frac{(Zinj + Zy + G_2) \cdot Vac/2}{Zy \cdot (Zinj + G_2 + G_1)}$$

The function of the second sub-component 61 faulting the gain G2 is to stabilize the operation of the electronic component 21 at high and low frequencies by eliminating the oscillations that occur at these frequencies.

The electronic component represented in FIG. 4 receives, on one of its inputs, a signal representative of the common mode current i measured at just one point on the electrical line 5. This measurement is here performed by the system 23 upstream of the point 26, that is to say between the connector 3 and the capacitors 28.

As represented in FIG. 5, according to a variant of the second exemplary implementation of the invention, the electronic component 21 can generate the potential from which the output voltage Vs results on the basis of two distinct measurements representative of the common mode current i, these measurements being performed at two different points on the electrical line 5. Thus, a first measurement system 23, arranged similarly to the measurement system of FIGS. 3 and 4 upstream of the point 26 on the electrical line 5, supplies a signal forming the input of the first sub-component 60 while a second measurement system 23, similar or not to the nanocrystalline magnetic core that can be used for the first measurement system 23, can be arranged downstream of the point 26.

The second measurement system 23 is, for example, arranged on the electrical line 5 between the capacitors 28 and the rectifying stage 8. This second measurement system 23 supplies as input for a third sub-component 62, globally forming a gain G3, a signal representative of the common mode current downstream of the capacitors 28. The output of the third sub-component 62 can be compared to the signal supplied by the measurement system 45 and the result of this comparison can form the true input for the second sub-component 61.

The gain G3 of the third sub-component 62 can be unitary and add a feed-forward control to the component 21.

Figure 6:
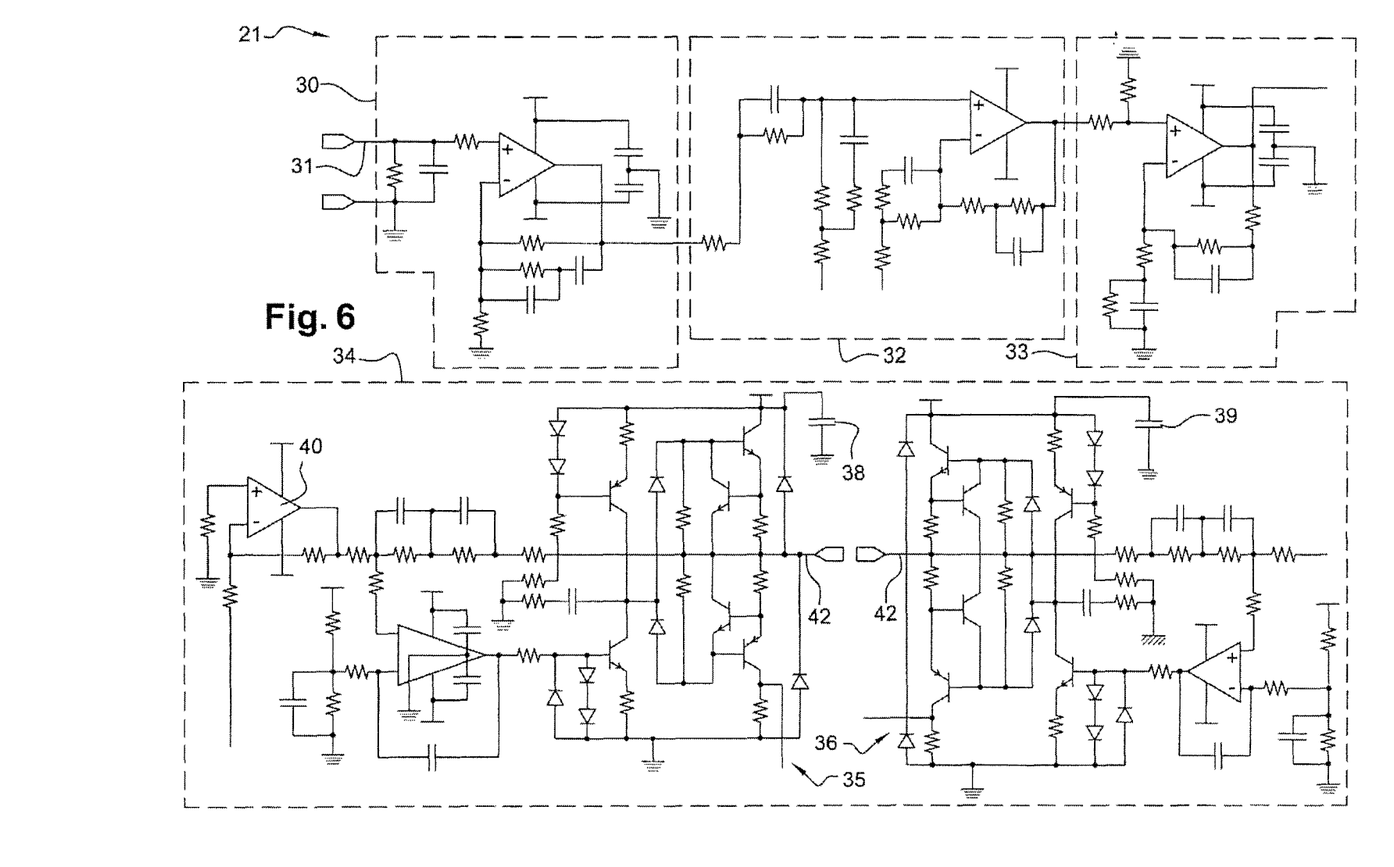
FIG. 6 represents the electrical circuit diagram of the electronic component of FIG. 4.

There now follows a description, with reference to FIG. 6, of a nonlimiting exemplary electrical circuit diagram of the electronic component 21 of FIG. 4.

The electronic component 21 comprises an input stage 30 receiving as input the voltage measured by a conductor 31 wound around the magnetic core of the measurement system 23. This input voltage is representative of the value of the common mode current i in the electrical line 5.

The role of the stage 30 is to amplify the voltage measurement thus performed while filtering the high frequencies.

The output of this stage 30 then drives a stage 32 for summing the signal from the stage 30 and a signal representative of the output current of the electronic component 21. This stage 32 makes it possible to lock the output current Is to the product of the gain G1 of the first sub-component 60 and of the common mode current measured by the measurement system 23.

The output of the stage 32 then drives a stage 33 forming a bandpass amplifier. The function of this stage 33 is to increase the overall gain of the loop formed in this example by the electronic component 21, and to cut the low and high frequencies.

The output of the stage 33 drives a high voltage output stage 34 which comprises, in the example described, two amplifiers 35 and 36.

Each of these amplifiers 35 or 36 generates a voltage from a signal obtained on the basis of the measurement performed by the system 23. The two amplifiers 35 and 36 may or may not be identical, and may or may not generate the same voltage. The first and the second voltages both have, for example, an amplitude of approximately 300 V.

As can be seen, the first amplifier 35 comprises an inverter mounting 40.

With the two amplifiers 35 and 36 represented in FIG. 6, a first voltage is applied between the point 26 and the internal ground 42 of the electronic component 21 by the second amplifier 36 while a second voltage of opposite sign is applied between the earth and the internal ground 42 of the electronic component 21 by the first amplifier 35. The difference between these two voltages corresponds to the voltage applied by the electronic component 21 between the point 26 and the earth to reduce, better cancel, the common mode current i.

In another example which is not represented, a single amplifier can be used to form the stage 34 generating the voltage Vs.

Figure 7:
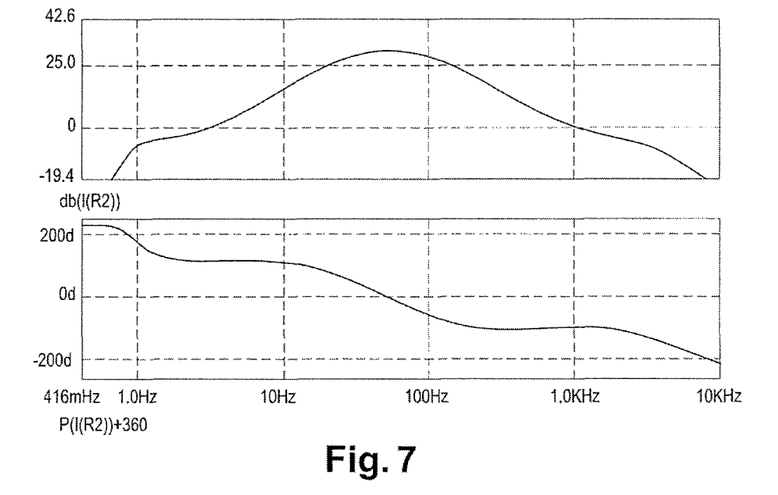
FIG. 7 is the Bode diagram of the transfer function of the electronic component of FIG. 4.

FIG. 7 represents the Bode diagram of the electronic component 21 which has just been described with reference to FIG. 6.

It is observed that the gain in dB is positive for frequencies between approximately 5 Hz and 1 kHz. It is also observed that the electronic component exhibits a gain of 31 dB between 50 Hz and 60 Hz, i.e. substantially of the frequency of the electricity network, and a low phase step when the gain in dB is canceled. Around 5 Hz, the phase margin is, in this example, 115°, whereas around 1 kHz, the phase step is −105°.

Figure 8:
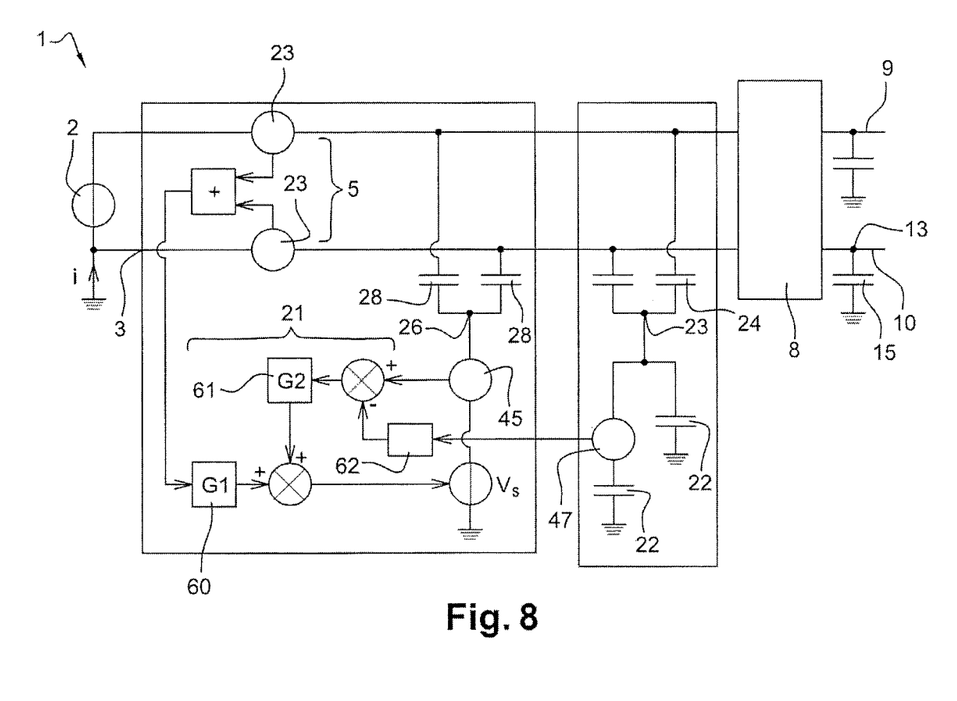
FIG. 8 represents, in a manner similar to FIGS. 3 to 5, an electronic component according to a third exemplary implementation of the invention, and FIGS. 9 to 11 differ respectively from FIGS. 3, 5 and 8 by the fact that the electronic component forms a current source and not a voltage source.

There now follows a description, with reference to FIG. 8, of an electronic component 21 according to a third exemplary implementation of the invention. Similarly to the variant of the second exemplary implementation of the invention which has just been described with reference to FIG. 5, according to this third exemplary implementation, the voltage Vs results from a potential applied by the electronic component 21 which is generated on the basis of three inputs.

In this example, the first input is the signal representative of the common mode current i measured upstream of the capacitors 28 on the electrical line, and the second input is the value of the output current Is circulating between the point 26 and the earth, as in the example of FIG. 5.

Unlike the example of FIG. 5, the third input is here formed by the value of a signal representative of the current circulating in one of the capacitors 22 of the electromagnetic interference filter 19.

This third input is acquired using a measurement system 47 installed in series with said capacitor 22 and it is processed by the third sub-component 62 which allows for a feed-forward control.

The output of this third sub-component 62 is then compared to the signal representative of the output current Is measured by the system 45, then the result of said comparison is received as input for the second sub-component 61.

With the same notations as above, and by using:
Cyf2 to designate the capacitance of the capacitor 22 of FIG. 8 in series with the measurement system 47,
Cyf1 to designate the capacitance of the capacitor 22 of FIG. 8 in parallel with the measurement system 47, and
Cor to designate the transfer function of the third sub-component 62, the equation giving the value of the common mode current as a function of the voltage Vac supplied by the electrical energy source 2 in the presence of the electronic component 21 of FIG. 8 is as follows:

$$i = \frac{\left(Zinj + Zy + G_2 \cdot \left(1 - Cor \cdot \frac{C_{yf1}}{C_{yf1} + C_{yf2} + C_{ybat}}\right)\right) \cdot Vac/2}{Zy \cdot (Zinj + G_2 + G_1)}$$

If the third sub-component 62 is chosen such that its transfer function takes the following value:

$$Cor = \frac{C_{yf1} + C_{yf2} + C_{ybat}}{C_{yf1}}$$

then the equation giving the value of the common mode current i as a function of the voltage supplied by the electrical energy source 2 in the presence of the electronic component of FIG. 8 becomes:

$$i = \frac{(Zinj + Zy) \cdot Vac/2}{Zy \cdot (Zinj + G_2 + G_1)}$$

The electronic component 21 according to FIG. 8 thus implements:
an open-loop mode control with feed-forward via the third sub-component 62 and the gain G2 supplied by the second sub-component 61 to eliminate the common mode current i, and
a control, via the first sub-component 60 supplying the gain G1 making it possible to eliminate the residual error linked to the inaccuracies, for example, on the values of Zy, Zybat, the earth impedance corresponding to the sum of the impedances 6 and 16 of FIG. 1, or even on the value of the transfer function of the third sub-component 62.

FIGS. 3 to 8 relate to an electronic component 21 injecting, at the point 26, an electrical quantity which is an electrical potential, that is to say that the electronic component 21 behaves like a voltage source.

Figure 9:
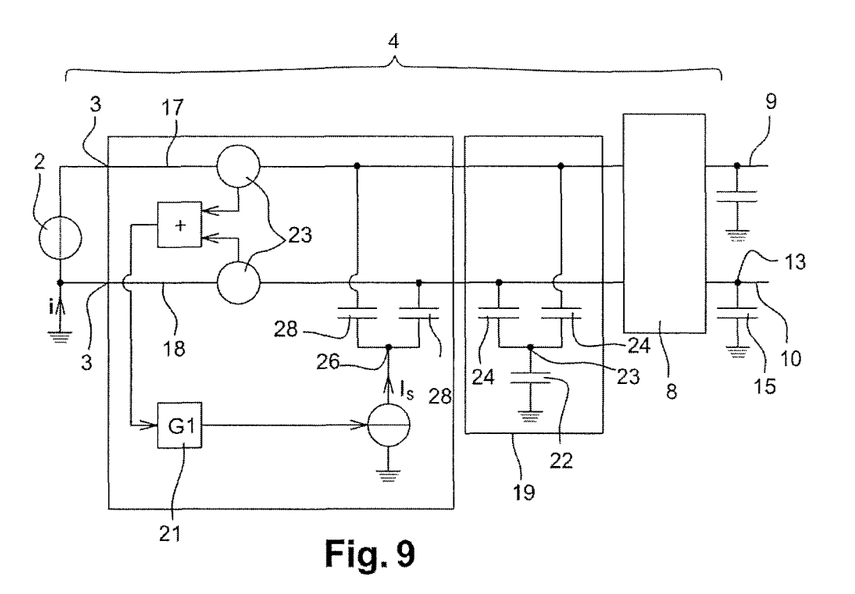
Figure 10:
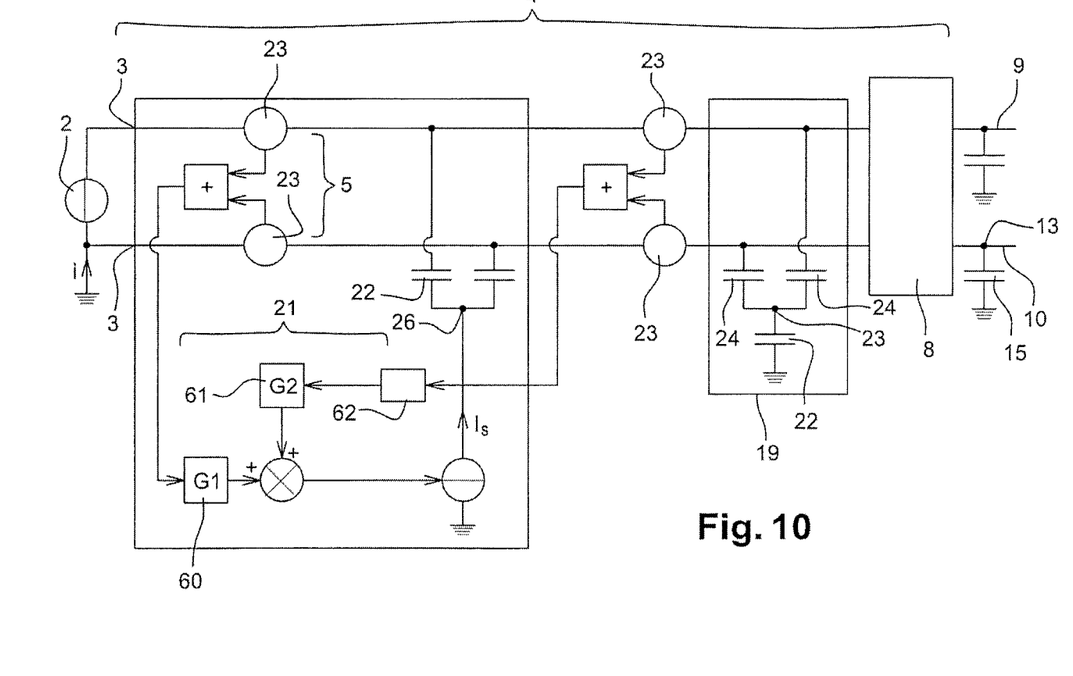
Figure 11:
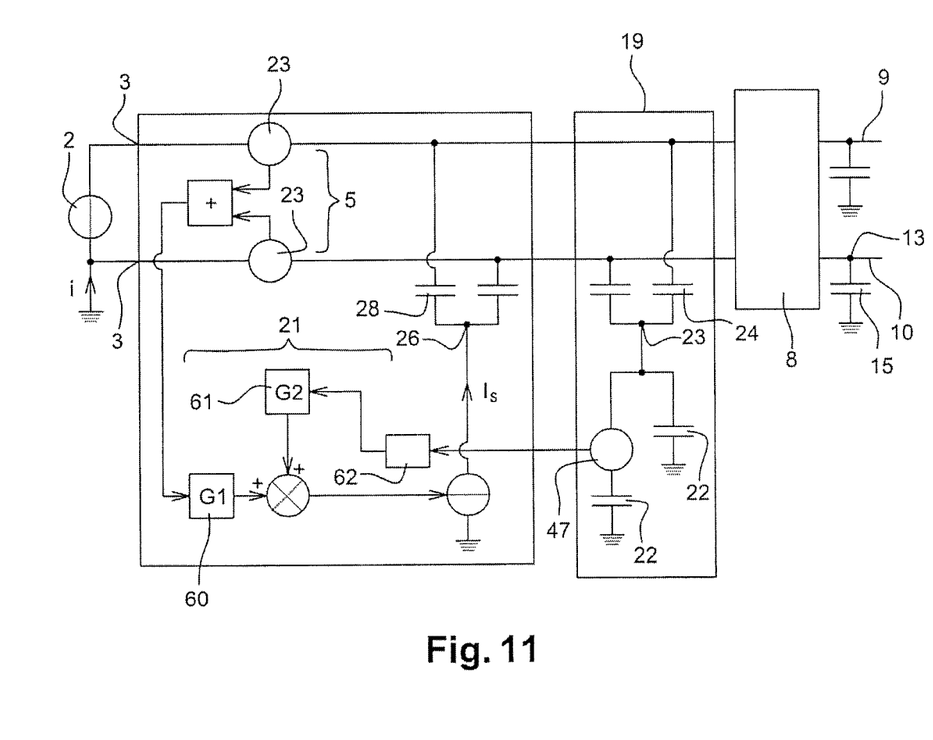

As a variant, as represented in FIGS. 9 to 11, the electronic component 21 can be configured to inject an electrical current at the point 26, this component 21 behaving like a current source.

FIG. 9 thus represents a variant of the first exemplary implementation of the invention of FIG. 3 differing therefrom only by the fact that the electronic component 21 injects a current and not an electrical potential.

FIG. 10 thus represents a variant of the second exemplary implementation of the invention of FIG. 5, differing therefrom only:
by the fact that the electronic component 21 injects a current and not an electrical potential, and
by the fact that the second sub-component 61 has the output of the third sub-component 62 as its sole input, that is to say that the electronic component which generates the current Is does not have the current Is for input but rather the common mode current upstream and downstream of the injection point 26.

FIG. 11 thus represents a variant of the third exemplary implementation of the invention of FIG. 8, differing therefrom only:
by the fact that the electronic component 21 injects a current and not an electrical potential, and
by the fact that the second sub-component 61 has the output of the third sub-component 62 for its sole input, that is to say that the generation by the electronic component 21 of the current Is is not done with this same current Is as input but rather with, as input, the common mode current upstream of the injection point 26 and the current circulating in the capacitor 22 of the filter 19.

The third sub-component 62 of the examples of FIGS. 10 and 11 makes it possible to implement feed-forward.

The invention can be applied to other circuits 4 than those installed on a vehicle.

The expression "comprising one" should be understood to mean "comprising at least one", unless specified otherwise.

The invention claimed is:

1. A method for reducing common mode current circulating between an internal ground of an electrical circuit and earth, when electrical energy is exchanged between an electrical energy storage unit of the electrical circuit and an electrical energy source external to the electrical circuit, the method comprising:
applying, by an electronic component, an electrical quantity at an injection point connected via at least one impedance to an electrical line of the electrical circuit via which the electrical energy is exchanged, the electrical quantity applied at a frequency of an electricity network thereby reducing the common mode current, the common mode current circulating between the internal ground of the electrical circuit and the earth,
wherein the electrical quantity is applied by the electronic component at least as a function of a signal representative of the common mode current measured on the electrical line between the electrical energy source of the electricity network and the at least one impedance connecting the electrical line to the injection point, the electronic component exhibiting a gain in dB that is positive for frequencies between 5 Hz and 1.1 kHz,
wherein the electrical quantity is applied by the electronic component as a function of:
a signal representative of the common mode current measured on the electrical line between the electrical energy source of the electricity network and the at least one impedance connecting the electrical line to the injection point, and
a signal representative of the current circulating between the injection point and the earth, and
wherein the electronic component comprises:
a first sub-component receiving as input the signal representative of the common mode current measured on the electrical line between the electrical energy source of the electricity network and the at least one impedance connecting the electrical line to the injection point, and
a second sub-component receiving as input the current circulating between the injection point and the earth, the outputs of each of the first and second sub-components being added together to generate the electrical quantity applied by the electronic component.

2. The method as claimed in claim 1, wherein the electrical line is single-phase and in which the electronic component applies the electrical quantity at an injection point connected:
to a single phase of the electrical line via at least one impedance inserted between the injection point and the phase, and
to a neutral of the electrical line via at least one impedance inserted between the injection point and the neutral.

3. The method as claimed in claim 1, wherein the electrical line is three-phase and wherein the electronic component applies the electrical quantity at the injection point connected to each phase of the electrical line via at least one respective impedance.

4. The method as claimed in claim 1, wherein the electrical quantity is applied by the electronic component as a function only of a signal representative of the common mode current measured on the electrical line between the electrical energy source of the electricity network and the at least one impedance connecting the electrical line to the injection point.

5. The method as claimed in claim 1, wherein the electrical quantity is applied by the electronic component as a function of:
a signal representative of the common mode current measured on the electrical line between the electrical energy source and the at least one impedance connecting the electrical line to the injection point,
a signal representative of the common mode current measured on the electrical line between the injection point and the electrical energy storage unit, and
a signal representative of the current circulating between the injection point and the earth.

6. The method as claimed in claim 1, wherein the electrical quantity is applied by the electronic component as a function of:
a signal representative of the common mode current measured on the electrical line between the electrical energy source of the electricity network and the at least one impedance connecting the electrical line to the injection point,
a signal representative of the current circulating between the injection point and the earth, and
a signal representative of the current circulating in a capacitor of an electromagnetic interference filter, the electromagnetic interference filter being arranged between the at least one impedance and the electrical energy storage unit.

7. The method as claimed in claim 1, wherein the electronic component is configured to lock value of the common mode current for which the electronic component receives a representative signal as input to a predefined setpoint value, notably zero.

8. The method as claimed in claim 1, wherein the electrical quantity is an electrical potential applied to the injection point and from which a voltage results that is applied between the injection point and the earth.

9. The method as claimed in claim 8, the voltage being applied between the injection point connected to the electrical line via the at least one impedance, and the earth, by applying:
a first voltage between the injection point and the internal ground of the electronic component, and
a second voltage, with a sign opposite to that of the first voltage, between the earth and the internal ground of the electronic component,
wherein the first and second voltages are applied such that a difference between the first and the second voltages is equal to a voltage resulting from the application by the electronic component of the electrical potential.

10. The method as claimed in claim 1, wherein the electronic component has no field effect transistor.

11. The method as claimed in claim 1, wherein a voltage at the terminals of the electrical energy source is an AC voltage whose frequency is 50 Hz or 60 Hz.

12. The method as claimed in claim 1, wherein the electronic component is configured to form an active filter of the common mode current only at the frequency of the electricity network.

13. The method as claimed in claim 1, wherein the electronic component is configured to filter:
only the common mode current at the frequency of the electricity network, and
only first ten harmonics of the frequency of the electricity network, of this common mode current.

14. The method as claimed in claim 1, wherein the common mode current is measured on the electrical line using a magnetic core around which are wound:
each conductor of the electrical line, and
a measurement conductor.

15. An electronic apparatus for implementing the method as claimed in claim 1.

16. A method for reducing a common mode current circulating between an internal ground of an electrical circuit and earth, when electrical energy is exchanged between an electrical energy storage unit of the electrical circuit and an electrical energy source external to the electrical circuit, the method comprising:
applying, by an electronic component, an electrical quantity at an injection point connected via at least one impedance to an electrical line of the electrical circuit via which the electrical energy is exchanged, the electrical quantity applied at a frequency of an electricity network thereby reducing the common mode current, the common mode current circulating between the internal ground of the electrical circuit and the earth,
wherein the electrical quantity is applied by the electronic component at least as a function of a signal representative of the common mode current measured on the electrical line between the electrical energy source of the electricity network and the at least one impedance connecting the electrical line to the injection point, the electronic component exhibiting a gain in dB that is positive for frequencies between 5 Hz and 1.1 kHz,
wherein the electrical quantity is applied by the electronic component as a function of:
a signal representative of the common mode current measured on the electrical line between the electrical energy source of the electricity network and the at least one impedance connecting the electrical line to the injection point, and
a signal representative of the current circulating between the injection point and the earth, and
a signal representative of the common mode current measured on the electrical ine between the injection point and the electrical energy storage unit.

17. A method for reducing a common mode current circulating between an internal ground of an electrical circuit and earth, when electrical energy is exchanged between an electrical energy storage unit of the electrical circuit and an electrical energy source external to the electrical circuit, the method comprising:

applying, by an electronic component, an electrical quantity at an injection point connected via at least one impedance to an electrical line of the electrical circuit via which the electrical energy is exchanged, the electrical quantity applied at a frequency of an electricity network thereby reducing the common mode current, the common mode current circulating between the internal ground of the electrical circuit and the earth, wherein the electrical quantity is applied by the electronic component at least as a function of a signal representative of the common mode current measured on the electrical line between the electrical energy source of the electricity network and the at least one impedance connecting the electrical line to the injection point, the electronic component exhibiting a gain in dB that is positive for frequencies between 5 Hz and 1.1 kHz, wherein the electrical quantity is applied by the electronic component as a function of:
- a signal representative of the common mode current measured on the electrical line between the electrical energy source of the network and the impedance or impedances connecting the electrical line to the injection point,
- a signal representative of the current circulating between the injection point and the earth, and
- a signal representative of the current circulating in a capacitor of an electromagnetic interference filter, the electromagnetic interference filter being arranged between the impedance or impedances and the electrical energy storage unit.

18. A method for reducing a common mode current circulating between an internal ground of an electrical circuit and earth, when electrical energy is exchanged between an electrical energy storage unit of the electrical circuit and an electrical energy source external to the electrical circuit, the method comprising:

applying, by an electronic component, an electrical quantity at an injection point connected via at least one impedance to an electrical line of the electrical circuit via which the electrical energy is exchanged, the electrical quantity applied at a frequency of an electricity network thereby reducing the common mode current, the common mode current circulating between the internal ground of the electrical circuit and the earth, wherein the electrical quantity is applied by the electronic component at least as a function of a signal representative of the common mode current measured on the electrical line between the electrical energy source of the electricity network and the at least one impedance connecting the electrical line to the injection point, the electronic component exhibiting a gain in dB that is positive for frequencies between 5 Hz and 1.1 kHz, wherein the electrical quantity is an electrical potential applied to the injection point and from which a voltage results that is applied between the injection point connected to the electrical line and the earth, wherein the voltage is applied by:
- a first voltage between the injection point and the internal ground of the electronic component, and
- a second voltage, with a sign opposite to that of the first voltage, between the earth and the internal ground of the electronic component,
- wherein the first and second voltages are applied such that the difference between the first and the second voltages is equal to the voltage resulting from the application by the electronic component of the electrical potential.

* * * * *